(12) United States Patent
Takahashi et al.

(10) Patent No.: US 7,890,515 B2
(45) Date of Patent: Feb. 15, 2011

(54) ARTICLE DISTRIBUTION SYSTEM AND ARTICLE DISTRIBUTION METHOD USED IN THIS SYSTEM

(75) Inventors: Noriko Takahashi, Minato-ku (JP); Takafumi Sera, Minato-ku (JP)

(73) Assignee: NEC Corporation, Tokyo (JP)

( * ) Notice: Subject to any disclaimer, the term of this patent is extended or adjusted under 35 U.S.C. 154(b) by 1006 days.

(21) Appl. No.: 11/453,836

(22) Filed: Jun. 16, 2006

(65) Prior Publication Data

US 2007/0136084 A1 Jun. 14, 2007

(30) Foreign Application Priority Data

Dec. 9, 2005 (JP) .............................. 2005-356257

(51) Int. Cl.
 G06F 7/00 (2006.01)
 G06F 17/30 (2006.01)
(52) U.S. Cl. ..................................................... 707/748
(58) Field of Classification Search ................. 707/748, 707/999.003
 See application file for complete search history.

(56) References Cited

U.S. PATENT DOCUMENTS

2002/0087515 A1* 7/2002 Swannack et al. ............... 707/2
2003/0023582 A1* 1/2003 Bates et al. ..................... 707/3

FOREIGN PATENT DOCUMENTS

| JP | 11-045279 A | 2/1999 |
|----|-------------|--------|
| JP | 11-053387 A | 2/1999 |
| JP | 2003-216563 A | 6/2003 |
| JP | 2004-078512 A | 3/2004 |
| JP | 2004-318404 A | 11/2004 |

* cited by examiner

*Primary Examiner*—Hosain T Alam
*Assistant Examiner*—Van H Oberly
(74) *Attorney, Agent, or Firm*—Sughrue Mion, PLLC

(57) ABSTRACT

An article distribution system is provided that can find threads that are active for articles among the users of a community. A user terminal for receiving the contribution of articles that are viewed among users is connected by way of a communication network to an article distribution device for registering articles and appraisal data in an article database. The article distribution device is provided with an article distribution unit, an article registration unit for performing registration, and an article appraisal unit. The article distribution unit receives article distribution requests from the user terminal and transmits article registration data that are relevant to the user terminal. The article registration unit displays article registration data that have been transmitted by the article distribution unit and receives the input of articles that contain cited portions to register these article registration data in the article database. Based on the articles that have been registered in the article registration unit, the article appraisal unit calculates appraisal values that include the article volume, the citation volume, and the citation ratio for each article and each thread and registers these appraisal data in the article database.

14 Claims, 2 Drawing Sheets

ARTICLE DISTRIBUTION SYSTEM AND ARTICLE DISTRIBUTION METHOD USED IN THIS SYSTEM

BACKGROUND OF THE INVENTION

1. Field of the Invention

The present invention relates to an article distribution system, and to an article distribution method and article distribution program that are used in an article distribution system.

2. Description of the Related Art

In an article contribution/distribution service of a community, contributed articles are displayed in the order of the times of contribution or in the order of higher rating values. Methods of rating each of the articles include a method in which users enter ratings and a method in which ratings are calculated from the number of accesses or number of contributed responses.

Examples of this type of technology are described in the inventions disclosed in JP-A-2003-216563 and JP-A-H11-053387. The "community analysis method and community analysis server" described in JP-A-2003-216563 is a configuration that is able to perform analyses for indicating the transition over time of opinions and responses that relate to opinions and views, by conferring to data from terminal devices attributes that indicate the content of the data and then analyzing the state of the community based on the attributes, the issuers of data, and the time the data were issued.

The "method and system for correlating documents" described in JP-A-H11-053387 is a configuration that can correlate a large volume of articles by calculating the degree of similarity between articles based on the degree of matching of words between articles for a collection of articles that have been ordered in a time series.

However, the above-described examples have several drawbacks. For example, the invention described in JP-A-2003-216563 focuses on conferring attributes to the offered topics, the submitted opinions, and responses to opinions and then analyzing the transition of these attributes, rather than focusing on the keywords contained in data. The invention described in JP-A-H11-053387 has the object of calculating the degree of similarity between articles for the purpose of correlating a large volume of articles. In both of these patent documents, the problem exists that the degree of relevance of articles to readers is not rated for threads.

The present invention was realized in view of the above-described situation and has the object of providing an article distribution system as well as an article distribution method and article distribution program that are used in the system, the system and method being directed to realizing an article contribution/distribution service in which the activity of threads of articles among the users in a community are appraised so as to allow the detection of threads that are active.

SUMMARY OF THE INVENTION

To solve the above-described problems, in the article distribution system of the present invention, user terminals are connected by way of a communication network to an article distribution device. The user terminals receive the contribution of articles that are viewed among users in the community. The article distribution device both manages threads, which are collections of related articles and, for each thread, registers in an article database article registration data that contain at least the content of articles and appraisal data that contain appraisal values for the content of these articles. The article distribution device then distributes the appraisal data together with the article registration data to the user terminals.

The article distribution device is further provided with an article transmitter, a response article registration unit, an article appraisal value registration unit, and a thread appraisal value registration unit. The article transmitter receives article distribution requests from user terminals and transmits relevant article registration data to relevant user terminals. The response article registration unit both displays on relevant user terminals, from among article registration data that are transmitted in from the article transmitter, the content of the articles, and, from among the content of the articles that have been viewed, receives the input of the content of relevant articles that contain any cited portions to register the article registration data in the article database. Based on the content of the articles that have been registered by the response article registration unit, the article appraisal value registration unit calculates, by a prescribed calculation method, appraisal values that include the article volume, the citation volume of the cited portions, and the citation ratio of the citation volume with respect to the article volume. The thread appraisal value registration unit calculates the appraisal values for the threads based on the appraisal data that have been registered by the article appraisal value registration unit, and registers the appraisal values in the article database. The article transmitter then transmits the appraisal data that have been registered by the article appraisal value registration unit and thread appraisal value registration unit to the relevant user terminals.

By adopting this configuration, articles that have been contributed by users are managed for each thread by article registration data and appraisal data to find the volume of articles and the citation rate for the content of articles that have been viewed by users, whereby the degree of users' interest in an article can be rated as the appraisal of the activity of a thread, and based on this appraisal, threads that are active can be found.

The above and other objects, features, and advantages of the present invention will become apparent from the following description with references to the accompanying drawings which illustrate examples of the present invention.

DETAILED DESCRIPTION OF THE PREFERRED EMBODIMENTS

Figure 1:
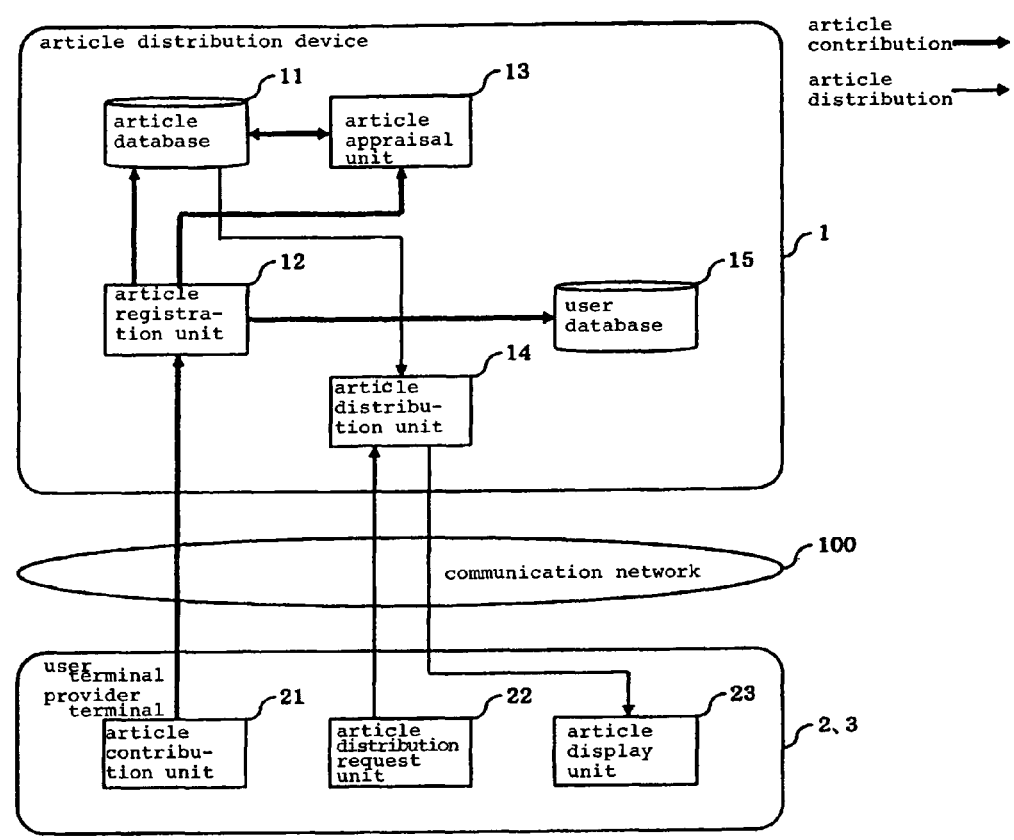
FIG. 1 is a block diagram showing the overall configuration of an article distribution system in a working example of this invention.

The object of providing an article distribution system that can appraise the activity of threads regarding articles among users of a community and thus find threads that are active based on this appraisal is realized by the following configuration.

User terminal 2 and article distribution device 1 are connected by way of communication network 100. User terminal 2 receives the contribution of articles that are viewed among users. Article distribution device 1 registers article registration data and appraisal data in article database 11.

Article distribution device 1 is provided with: article distribution unit 14 (the article transmitter); article registration unit 12 (the response article registration unit); article appraisal unit 13 (the article appraisal value registration unit); and article appraisal unit 13 (the thread appraisal value registration unit). Article distribution unit 14 (the article transmitter) receives article distribution requests from user terminal 2 and transmits the relevant article registration data to user terminal 2.

Based on the article registration data that are transmitted from article distribution unit 14, article registration unit 12 (the response article registration unit) displays articles on user terminal 2, accepts the input of articles that include cited portions, and registers the article registration data of these articles in article database 11. Based on the articles that have been registered in article registration unit 12, article appraisal unit 13 (the article appraisal value registration unit) calculates appraisal values that include the article volume, the citation volume and the citation ratio, and registers these appraisal data in article database 11. Article appraisal unit 13 (the thread appraisal value registration unit) calculates appraisal values for threads based on the appraisal data that have been registered by article appraisal unit 13 (the article appraisal value registration unit), and registers these appraisal data in article database 11.

The following explanation regards an embodiment of this invention with reference to the figures. The explanation will employ an actual working example.

Working Example

Figure 2:
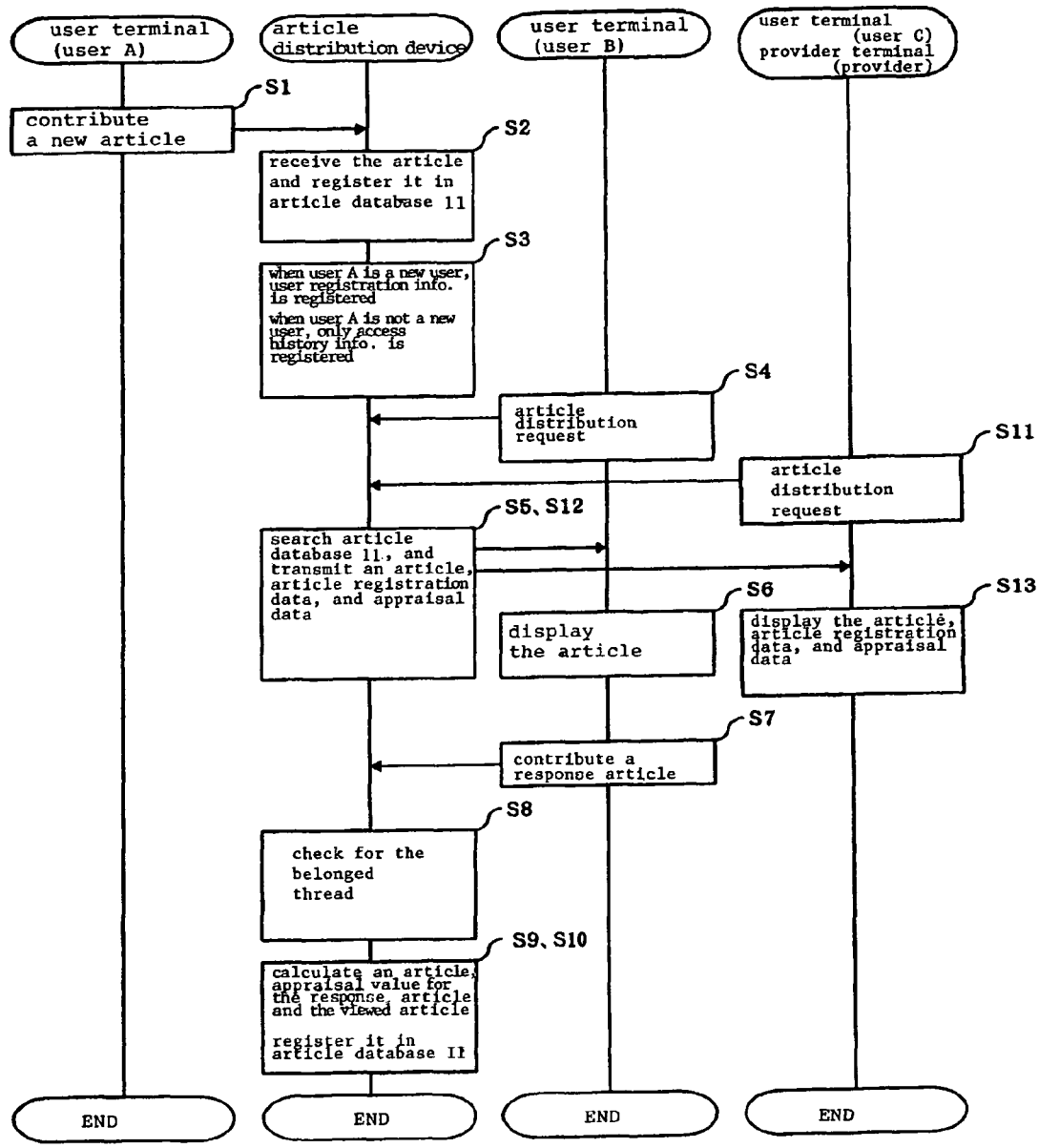
FIG. 2 is a flow chart for explaining the operations of this system.

FIG. 1 is a block diagram showing the overall configuration of an article distribution system in a working example of this invention. FIG. 2 is a flow chart for explaining the operation of this system.

Explanation first regards the overall configuration of the article distribution system. As shown in FIG. 1, the article distribution system of this example is made up from: article distribution device 1 in a community and user terminal 2 and provider terminal 3 that are connected to article distribution device 1 by way of communication network 100 such as the Internet.

Article distribution device 1 is an information processing device such as a work station server that is established by the provider that runs an article distribution system, and is made up from: article database 11, article registration unit 12 (the response article registration unit), article appraisal unit 13 (the article appraisal value registration unit and thread appraisal value registration unit), article distribution unit 14 (the article transmitter and article selection unit), and user database 15.

Article database 11 holds articles that have been received by article registration unit 12, article registration data that have been correlated with these articles, and appraisal data that contain appraisal values for the content of these articles. Information is set in the article registration data that includes, for example, the thread identification number to which an article belongs, article identification numbers, link source article identification numbers, contribution dates, and information of contributors; and appraisal value information is set in the appraisal data that includes, for example, the article volume, the citation volume, the citation rate, the number of cited points, the total citation volume, the total citation ratio, the total number of cited points, and the total number of contributions.

Of this information, the thread identification numbers, article identification numbers, link source article identification numbers, dates of contribution, and the information of the contributors are registered to the contributed article by article registration unit 12; and the information such as the article volume, citation volume, citation ratio, and number of cited points are registered by article appraisal unit 13. In addition, information such as the total citation volume, the total citation ratio, the total number of cited points, and the total number of contributions is registered by article appraisal unit 13 for the plurality of articles that are contributed after viewing contributed articles. By thus configuring article database 11 as a database in which appraisal values for the content of contributed articles are compared with the totals of the appraisal values for the plurality of articles that have been contributed after viewing these articles, a configuration is realized that can find appraisal values for contributed articles and threads.

Article registration unit 12 receives a contributed article such as a new article or response article from article contribution unit 21 of user terminal 2 and registers the received article and article registration data in article database 11. Article registration unit 12 acquires user registration information of user database 15 and sets this information in the contributor information that is set in the article registration data. Article registration unit 12 further creates appraisal calculation request data of a new article or of a response article and delivers this appraisal calculation request data to article appraisal unit 13.

Explanation first regards the processes for receiving a contributed article and registering the received article and article registration data in article database 11. Each time article registration unit 12 receives a contributed article, article registration unit 12 checks to determine whether a thread identification number of the thread to which the article belongs has been set in the contributed article, sets the following settings in each item of information of the article registration data, and registers this information together with the received article in article database 11.

(1) If the thread identification number has not been set, article registration unit 12 sets information such as the thread identification number (sets the number in a new number series), article identification number (sets the number in a new number series), and link source article identification number (sets "0") in the article registration data.

(2) When a thread identification number has been set, article registration unit 12 sets information such as a thread identification number (sets the thread identification number of the article that has been viewed), an article identification number (sets the number in a new number series), and a link source article identification number (sets the article identification number of the article that has been viewed) in the article registration data.

Explanation next regards the process of creating appraisal calculation request data of, for example, a new article or response article that is to be transferred to article appraisal unit 13.

(1) In the appraisal calculation request data of a new article, information of appraisal values is set, such as the thread identification number (a number is set in a new number series), an article identification number (the number is set in a new number series), a link source article identification number ("0" is set), an article (the content of the new article is set), a cited portion (a blank is set), the number of cited points ("0" is set), and the contribution number ("0" is set).

(2) In addition, in the appraisal calculation request data of a response article, information of appraisal values is set, such as the thread identification number (the thread identification number of the article that has been viewed is set), the article identification number (the number is set in a new number series), the link source article identification number (the article identification number of the article that has been viewed is set), the article (the content of the response article is set), the cited portion (the cited portion of the content of the article that has been viewed is set), the number of cited points (the number of cited points, which is the total number of cited portions of the content of the viewed article, is set), and the contribution number ("1" is set).

In article appraisal unit 13, the appraisal calculation request data are received from article registration unit 12 and the appraisal data that are registered in article database 11 are updated for the contributed articles and articles that have been viewed.

In the appraisal calculation request data, information of the appraisal values has been set such as the thread identification number, the article identification number, the link source article identification number, the article, the cited portion, the number of cited points, and the contribution number, as described in the process of creating the appraisal calculation request data that are delivered to article appraisal unit 13 by article registration unit 12.

Explanation next regards the process of updating the appraisal data for contributed articles and articles that have been viewed.

(1) Regarding the updating of the appraisal data for a contributed article, article appraisal unit 13 searches article database 11 using the thread identification number and article identification number of the appraisal calculation request data, acquires the relevant appraisal data, and sets the information of each of the appraisal values of the appraisal calculation request data to the information of each of the appraisal values of the acquired appraisal data as described below to update the appraisal data.

Regarding the content of the settings, the article volume and citation volume are found from the information of the article and cited portion of the appraisal calculation request data by a prescribed calculation method, and article appraisal unit 13 updates the information of each of the appraisal values such as the article volume (sets the article volume that has been calculated), the citation volume (sets the citation volume that has been calculated), the citation ratio (calculates and sets the ratio of the citation volume to the article volume), the number of cited points (sets the number of cited points), the total citation volume (sets "0"), the citation rate (sets "0"), the total number of cited points (sets "0"), and the total number of contributions (sets "0").

(2) Regarding the updating of the appraisal data for viewed articles, article appraisal unit 13 uses the thread identification number and article identification number of the appraisal calculation request data to search article database 11, acquires the relevant appraisal data, and sets the information of each appraisal value of the appraisal calculation request data to the information of each appraisal value of appraisal data that has been acquired as described below to realize updating.

Regarding the content of the settings, article appraisal unit 13 updates the information of each of the appraisal values such as the total citation volume (set by adding together the calculated citation volume), the citation ratio (set by calculating the ratio of the total citation volume to the article volume), the total number of cited points (set by adding together the number of cited points), and the total number of contributions (set by adding the number of contributions).

Regarding the method of calculating the article volume from articles that have been set in the appraisal calculation request data and regarding the method of calculating the citation volume for cited portions, a method is adopted in which the number of characters in the articles and in the cited portions are counted, and these numbers of characters are then taken as the article volume and the citation volume.

Article distribution unit 14 receives an article distribution request from article distribution request unit 22 of user terminal 2, and extracts one or a plurality of articles that are relevant to the article distribution request to distribute to article display unit 23 of user terminal 2.

User registration information and information of the history of access from user terminal 2 to article database 11 are registered in user database 15 for the contributors of articles and readers that receive the distribution of contributed articles.

User terminal 2 and provider terminal 3 are, for example, PC (personal computers), PDA (personal digital assistants), or portable terminals capable of data communication and are made up from, for example, article contribution unit 21, article distribution request unit 22, and article display unit 23. Article contribution unit 21 is used by the contributor, and the other components are used by readers or the provider that operates the article distribution system.

Article contribution unit 21 contributes articles to article registration unit 12 of article distribution device 1. As the method of contribution, a method is adopted in which contribution window of article distribution device 1 constructed on the Web (World-Wide Web) is accessed by means of the Web browser of user terminal 2, an article file that has been created within user terminal 2 is designated, and the designated article then uploaded. A file in HTML (HyperText Markup Language) format can be offered as an example of the article format, and in this invention, the collection of a series of still pictures or moving picture files that are consulted from the HTML is referred to as an article.

Article distribution request unit 22 issues a request to article distribution unit 14 of article distribution device 1 to distribute an article. Article display unit 23 receives the article from article distribution unit 14 of article distribution device 1 and displays the article on user terminal 2.

Explanation next regards the operation of the article distribution system with reference to FIG. 1 and FIG. 2.

User A first contributes a new article from user terminal 2 (Step S1). Article registration unit 12 receives this new article and registers the article in article database 11 (Step S2). When user A is a new user, user registration information is registered in user database 15; and when user A is not a new user, only access history information is registered in user database 15 (Step S3).

Another user, B or user A next submits an article distribution request from user terminal 2 (Step S4), This article distribution request is submitted by adding information such as the article identification number of the article for which the distribution request is being carried out.

Article distribution unit 14 next receives this article distribution request, searches article database 11 for the article and article registration data that pertain to the article distribution request, and transmits these data to article display unit 23. The article registration data for which distribution was requested is further acquired at this time (Step S5: article transmitter, response article registration step).

Article display unit 23 next receives and displays the article that was transmitted in Step S5 (Step S6), and user B views the displayed article and contributes a response article that contains cited portions that are portions included in the content of this article (Step S7).

When the response article is contributed, article registration unit 12 receives this response article, checks for the thread to which this response article belongs (Step S8), and then registers in article database 11 the response article and article registration data in which information is set such as the thread identification number (sets the thread identification number that was acquired in Step S5), the article identification number (sets the number of a new number series), and the link source article identification number (sets the article identification number that was acquired in Step S5).

Article appraisal unit 13 searches article database 11 for the response article that has been contributed based on the thread identification number that was acquired in Step S5 and the article identification number that was assigned a number in Step S8, acquires the relevant appraisal data, and updates by setting, to the appraisal data, the information of each of the appraisal values such as the article volume (sets the article volume that was calculated by a prescribed calculation method based on the content of the article for which input was received in Step S7), the citation volume (sets the citation volume that was calculated by a prescribed calculation method based on the cited portions for which input was received in Step S7), the citation ratio (sets by calculating the ratio of the citation volume to the article volume), the number of cited points (sets the number of cited points that is obtained by adding the citation portions for which input was received in Step S7), the total citation volume (sets "0"), the total citation ratio (sets "0"), the total number of cited points (sets "0"), and the total number of contributions (sets "0") (Step S9: article appraisal value registration unit, article appraisal value registration step).

Article appraisal unit next uses the article identification number and the thread identification number of the article that was acquired in Step S5 to search article database 11 regarding viewed articles for which distribution has been requested and thus acquires the relevant appraisal data, and updates by setting, to the appraisal data, the information of each appraisal value of, for example, the total citation volume (sets by adding the citation volume that was calculated in Step S9), the total citation ratio (sets by calculating the ratio of the total citation volume to the article volume), the total number of cited points (sets by adding the numbers of cited points that were calculated in Step S9), and the total number of contributions (sets by adding the numbers of contributions that were obtained by adding when registering the response article in Step S8) (Step S10: thread appraisal value registration unit, thread appraisal value registration step).

Next, user C (user A, user B, or another user) carries out an article distribution request from user terminal 2. In the case of the provider, a thread search request is carried out from provider terminal 3 (Step S11).

Article distribution device 14 next receives this article distribution request or thread search request, and searches article database 11 for articles, article registration data, and appraisal data that are relevant to the article distribution request in order to transmit these data to article display unit 23 (Step S12).

Article display unit 23 next receives the articles, the article registration data, and the appraisal data that were transmitted in Step S12, and user C or the provider selects the information that is required for display from among the article registration data and appraisal data and carries out information value range settings for restricting the information that is to be displayed from among the selected information or performs settings of display conditions such as descending-order or ascending-order settings to designate the order of display of the information so as to display a list of the set information for each article (Step S13).

User C next make a selection from among the list of information articles for which distribution requests are to be carried out based on the information of each of the appraisal values such as the displayed article volume, total citation volume, citation ratio, total number of cited points, total number of contributions (article selection unit).

The response contribution of Steps S4-S13 is subsequently repeated.

Thus, according to the configuration of the present working example, user terminal 2 that receives the contribution of articles that are viewed among users in a community is connected by way of communication network 100 to article distribution device 1 that registers article registration data and appraisal data in article database 11. Article distribution device 1 is made up from: article distribution unit 14 (the article transmitter) for receiving article distribution requests from user terminal 2 and transmitting relevant article registration data to user terminal 2; article registration unit 12 (the response article registration unit) for displaying articles on user terminal 2 by means of article registration data that have been transmitted by article distribution unit 14 and for receiving the input of articles that contain cited portions and registering these article registration data in article database 11; article appraisal unit 13 (the article appraisal value registration unit) for calculating article volume, citation volume, and citation ratios from articles that are registered in article registration unit 12 and registering appraisal data of these values in article database 11; and article appraisal unit 13 (the thread appraisal value registration unit) for calculating appraisal values that take threads as objects from appraisal data that are registered in article appraisal unit 13 (the article appraisal value registration unit) and for registering the appraisal data of these values in article database 11.

The users and provider of a system can thus appraise the activity of a thread and discover threads that are active from these appraisals.

A working example of this invention has been described above based on the figures, but the actual configuration of this invention is not limited to only this working example, and the present invention includes various design modifications within a scope that does not depart from the gist of this invention.

For example, in the above-described working example, information of each appraisal value for intervals of any length can be set as the information that is set in appraisal data to enable the investigation of trends in each appraisal value in a thread.

In addition, the invention can be realized such that the configuration ratios of the totals of each thread to the totals of each appraisal value of all threads are calculated and displayed to discover threads that are active among all threads.

While preferred embodiments of the present invention have been described using specific terms, such description is for illustrative purposes only, and it is to be understood that changes and variations may be made without departing from the spirit or scope of the following claims.

What is claimed is:

1. An article distribution system comprising:
    a user terminal for receiving contributed articles that are viewed among users in a community; and
    an article distribution device provided with:
    an article transmitter for receiving article distribution requests from a user terminal, for transmitting relevant article registration data that contain at least the content of said articles to the relevant user terminal and for displaying, on the user terminal, said content of said articles;
    a response article registration unit for both receiving, from among the content of said articles that have been viewed, a response article that contains cited portions of one or more of said articles and registering said response article in an article database in a thread that contains a group of relevant articles;

an article appraisal value registration unit for, based on content of said response article that has been registered by said response article registration unit, calculating article appraisal values that include: article volume, citation volume of said cited portions, and citation ratio of said citation volume with respect to said article volume, and for registering article appraisal data that include said article appraisal values for the content of said response article in said article database for said thread; and a thread appraisal value registration unit for calculating a thread appraisal value for said thread based on said article appraisal data that have been registered by said article appraisal value registration unit, and for registering thread appraisal data that includes said thread appraisal value in said article database for said thread;

wherein said article transmitter transmits said article appraisal data and said thread appraisal data that have been registered by said article appraisal value registration unit and said thread appraisal value registration unit, respectively, to the user terminal, wherein said article appraisal value registration unit and said thread appraisal value registration unit calculate configuration ratios of said thread appraisal value with respect to each of said article appraisal values, and wherein the article volume and the citation volume are calculated based on a number of characters in said response article and said cited portions of one or more of said articles in said response article.

2. An article distribution system according to claim 1, wherein said article appraisal values include, in addition to said citation volume for said cited portions, the number of cited points that is obtained by adding said cited portions.

3. An article distribution system according to claim 1, wherein said article appraisal values include a number of contributions that is obtained by adding a number of said articles that are contributed to said response article after viewing said articles.

4. An article distribution system according to claim 1, wherein said article transmitter is provided with an article selection unit for displaying on said user terminal a list of any information that is included in said article registration data, said thread appraisal data and said article appraisal data; and for accepting the selection of any of said article registration data from within the list to transmit to the user terminal said article registration data that are relevant.

5. An article distribution system according to claim 4, wherein said article distribution device is connected to a provider terminal by way of a communication network, and said article selection unit receives thread search requests from said provider terminal to display said article registration data, said thread appraisal data and said article appraisal data on the provider terminal.

6. An article distribution system according to claim 1, wherein said article transmitter, when displaying said article registration data, said thread appraisal data and said article appraisal data on the user terminal, performs display based on display conditions for the information for any information that is contained in the article registration data, said thread appraisal data and said article appraisal data.

7. An article distribution system according to claim 6, wherein said article distribution device is connected to a provider terminal by way of a communication network, and said article selection unit receives thread search requests from said provider terminal to display said article registration data, said thread appraisal data and said article appraisal data on the provider terminal.

8. An article distribution method used in an article distribution system in which a user terminal for receiving contributed articles that are viewed among users of a community is connected by way of a communication network to an article distribution device for both managing threads, which are groups of said articles that are relevant, and registering for each of said threads in an article database article registration data that include at least the content of said articles and article appraisal data that contain article appraisal values for the content of the articles to distribute said article appraisal data together with said article registration data to said user terminals; said article distribution method comprising:

a) registering said article registration data and said article appraisal data in an article database for information registration that has been established beforehand;

b) receiving article distribution requests from said user terminal and transmitting said article registration data that are relevant to the user terminal;

c) both displaying on the user terminal, from among said article registration data that have been transmitted, the content of said articles, and receiving, from among the content of said articles that have been viewed, a response article that contains cited portions of one or more of said articles in order to register said response article in said article database;

d) based on the content of said response article that has been registered in said article database, calculating relevant article appraisal values that include article volume, citation volume of said cited portions, and the citation ratio of said citation volume to said article volume and registering said article appraisal data in said article database;

e) based on said appraisal data that have been registered in said article database, calculating a thread value for a thread corresponding to said response article and registering thread appraisal data in said article database;

f) calculating configurations ratios of said thread appraisal value with respect to each of said article appraisal value; and g) transmitting said article appraisal data and said thread appraisal data that have been registered in said article database to the user terminal, wherein the article volume and the citation volume are calculated based on a number of characters in said response article and said cited portions of one or more of said articles in said response article.

9. An article distribution method according to claim 8, wherein said article appraisal values include, in addition to said citation volume for said cited portions, the number of cited points that is obtained by adding together said cited portions.

10. An article distribution method according to claim 8, wherein said article appraisal values include a number of contributions that is obtained by adding together a number of said articles that have been contributed to said response article after viewing said articles.

11. An article distribution method according to claim 8, wherein, in said step of transmitting said thread appraisal data and said article appraisal data, a list of any information that is included in said article registration data, said thread appraisal data and said article appraisal data is displayed on said user terminal, and the selection of any of said article registration data from within the list is accepted to transmit said article registration data that are relevant to the user terminal.

12. A article distribution method according to claim 8, wherein, in the step of transmitting said thread appraisal data and said article appraisal data, when displaying said article registration data, said thread appraisal data and said article appraisal data on the user terminal, display is realized based on display conditions for that information for any information that is included in the article registration data, said thread appraisal data and said article appraisal data.

13. A computer readable storage medium embodying a program for, in an article distribution system in which a user terminal for receiving contributed articles that are viewed among users of a community is connected by way of a communication network to an article distribution device for both managing threads, which are groups of said articles that are relevant, and registering for each of said threads in an article database article registration data that include at least the content of said articles and article appraisal data that contain article appraisal values for the content of the articles to distribute said article appraisal data together with said article registration data to said user terminal, causing a computer to operate as said article distribution device; said program causing a computer to execute processes of:

a) registering said article registration data and said article appraisal data in an article database for information registration that has been established beforehand;

b) receiving article distribution requests from said user terminal and transmitting said article registration data that are relevant to the user terminal;

c) both displaying on the user terminal, from among said article registration data that have been transmitted, the content of said articles, and receiving, from among the content of said articles that have been viewed, a response article that contains cited portions of one or more of said articles in order to register said response article in said article database;

d) based on the content of said response article that has been registered in said article database, calculating relevant article appraisal values that include article volume, citation volume of said cited portions, and the citation ratio of said citation volume to said article volume, and registering said article appraisal data in said article database;

e) based on said appraisal data that have been registered in said article database, calculating a thread appraisal values for a thread corresponding to said response article and registering thread appraisal data in said article database;

f) calculating configurations ratios of said thread appraisal value with respect to each of said article appraisal value; and g) transmitting said article appraisal data and said thread appraisal data that have been registered in said article database together with said article registration data to the user terminal, wherein the article volume and the citation volume are calculated based on a number of characters in said response article and said cited portions of one or more of said articles in said response article.

14. An article distribution device that is connected by way of a communication network to a user terminal for receiving contributed articles that are viewed among users of a community, and that both manages threads, which are groups of said articles that are relevant, and registers for each of said threads in an article database, article registration data that include at least the content of said articles and article appraisal data that include article appraisal values for the content of the articles to distribute said article appraisal data together with said article registration data to said user terminal; said article distribution device comprising:

an article transmitter for receiving article distribution requests from said user terminal and for transmitting said article registration data that are relevant to the user terminal in advance, for transmitting said article appraisal data and thread appraisal data that are subsequently registered in an article appraisal value registration unit and in a thread appraisal value registration unit to the user terminal and for displaying, on the user terminal, the content of said articles;

a response article registration unit for both receiving, from among the content of said articles that have been viewed, a response article that contains cited portions of one or more of said articles and registering said response article in said article database;

an article appraisal value registration unit for, based on the content of said response article that has been registered in said response article registration unit, calculating said article appraisal values that include: article volume, citation volume of said cited portions, and the citation ratio of said citation volume to said article volume, and for registering said article appraisal data in said article database; and a thread appraisal value registration unit for calculating a thread appraisal value for a thread corresponding to said response article based on said article appraisal data that have been registered by said article appraisal value registration unit, and for registering said thread appraisal data in said article database, wherein said article appraisal value registration unit and said thread appraisal value registration unit calculate configuration ratios of said thread appraisal value with respect to each of said article appraisal values, and wherein the article volume and the citation volume are calculated based on a number of characters in said response article and said cited portions of one or more of said articles in said response article.

\* \* \* \* \*